United States Patent
Oswal et al.

(10) Patent No.: US 7,920,519 B2
(45) Date of Patent: Apr. 5, 2011

(54) TRANSFERRING CONTEXT INFORMATION TO FACILITATE NODE MOBILITY

(75) Inventors: Anand K. Oswal, Santa Clara, CA (US);
Viren K. Malaviya, Cupertino, CA (US); John G. Waclawsky, Frederick, MD (US); David P. Lindert, San Jose, CA (US); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 11/105,007

(22) Filed: Apr. 13, 2005

(65) Prior Publication Data

US 2006/0233135 A1    Oct. 19, 2006

(51) Int. Cl.
*H04W 4/00*    (2009.01)

(52) U.S. Cl. ......... 370/331; 370/390; 455/442; 455/443

(58) Field of Classification Search .................. 370/331, 370/352, 351, 389–390, 400–405; 455/439, 455/436, 442, 443, 440
See application file for complete search history.

(56) References Cited

U.S. PATENT DOCUMENTS

| | | | | |
|---|---|---|---|---|
| 6,466,964 B1 * | 10/2002 | Leung et al. | ................. | 709/202 |
| 6,611,751 B2 | 8/2003 | Warren | .................. | 701/200 |
| 6,714,778 B2 | 3/2004 | Nykanen et al. | .......... | 455/414.1 |
| 6,832,087 B2 * | 12/2004 | Gwon et al. | .................. | 455/436 |
| 7,443,835 B2 * | 10/2008 | Lakshmi Narayanan et al. | ............................ | 370/352 |
| 2002/0045450 A1 * | 4/2002 | Shimizu et al. | .............. | 455/442 |
| 2002/0160785 A1 * | 10/2002 | Ovesjo et al. | ................. | 455/453 |
| 2003/0207688 A1 * | 11/2003 | Nikkelen | ....................... | 455/439 |
| 2005/0130660 A1 * | 6/2005 | Park et al. | ..................... | 455/436 |

OTHER PUBLICATIONS

Politi, Carol, "*Focus On The Wireless World, Enabling the New Mobile Ecosystem*", Megisto Systems, www.megisto.com, 4 pages, 2005.

* cited by examiner

*Primary Examiner* — Edward Urban
*Assistant Examiner* — Christian A Hammon
(74) *Attorney, Agent, or Firm* — Baker Botts L.L.P.

(57) ABSTRACT

Facilitating node mobility includes facilitating a communication session for a mobile node communicated along a first communication path. A first anchor point manages context information for the communication session, where the context information comprises information for supporting the communication session. A command to transfer the context information to a second anchor point is received from a home agent. The second anchor point is operable to facilitate communication of the communication session along a second communication path. The context information is transferred in response to the command.

24 Claims, 5 Drawing Sheets

TRANSFERRING CONTEXT INFORMATION TO FACILITATE NODE MOBILITY

TECHNICAL FIELD

This invention relates generally to the field of communications and more specifically to transferring context information to facilitate node mobility.

BACKGROUND

A communication network may establish a communication session for a node. A node may have the capability to move its attachment point within a network or to another network. A node that has this capability may be referred to as a "mobile node." The communication session allows the mobile node to communicate with other endpoints. The mobile node may move to another location serviced by a different communication network. Accordingly, techniques are implemented to allow the next communication network to continue to support the communication session, thus providing continuity of service.

Known techniques, however, are not efficient in certain situations. It is generally desirable to have efficient techniques in certain situations.

SUMMARY OF THE DISCLOSURE

In accordance with the present invention, disadvantages and problems associated with previous techniques for facilitating node mobility may be reduced or eliminated.

According to one embodiment of the present invention, facilitating node mobility includes facilitating a communication session for a mobile node communicated along a first communication path. A first anchor point manages context information for the communication session, where the context information comprises information for supporting the communication session. A command to transfer the context information to a second anchor point is received from a home agent. The second anchor point is operable to facilitate communication of the communication session along a second communication path. The context information is transferred in response to the command.

Certain embodiments of the invention may provide one or more technical advantages. A technical advantage of one embodiment may be that a new anchor point is established when a mobile node moves to a new communication network. The new anchor point allows for communicating along a communication path that bypasses the old anchor point. Bypassing the old anchor point may improve network capacity and reduce network latency.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
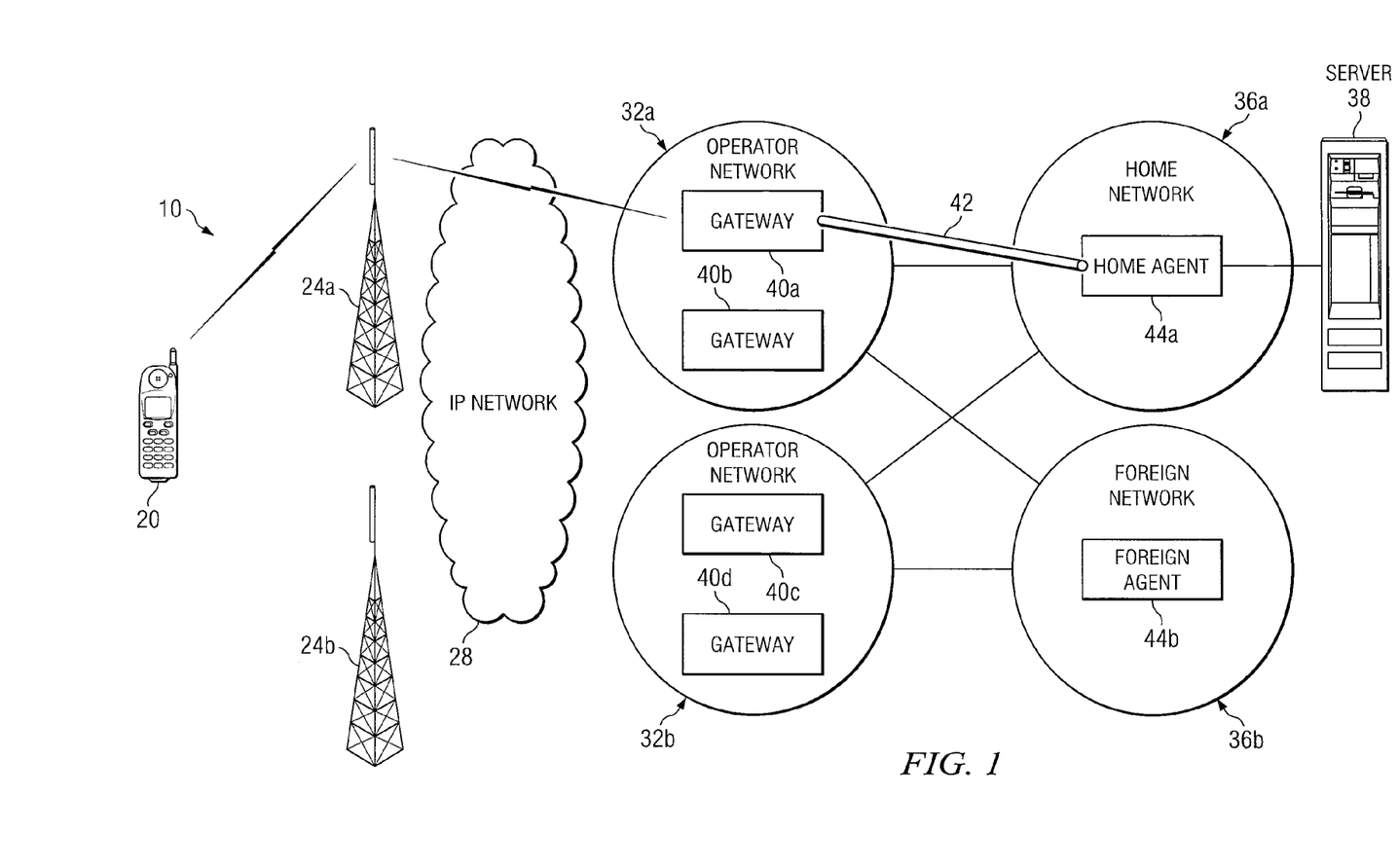
FIG. 1 is a block diagram illustrating one embodiment of a system operable to transfer context information in order to facilitate node mobility.

FIG. 1 is a block diagram illustrating one embodiment of a system 10 operable to transfer context information in order to facilitate node mobility. System 10 may establish a communication session for a mobile node. An anchor point may manage the context information for the communication session. The node may move. Context information may be transferred to a new anchor point that communicates the session along a path that bypasses the old anchor point. Bypassing the old anchor point may improve network capacity and reduce network latency.

According to the illustrated embodiment, a mobile node 20 may represent any suitable logic comprising software, hardware, other logic, or any suitable combination of the preceding operable to communicate with a communication system. Mobile node 20 may comprise, for example, a personal digital assistant, a cellular telephone, a mobile handset, or any other device operable to communicate with system 10.

System 10 may operate to provide telephony or advanced data services, such as communication sessions, for endpoints such as mobile node 20. A communication session may refer to an active communication between endpoints, measured from endpoint to endpoint. Information is communicated between endpoints during a communication session. Information may refer to data, text, audio, video, multimedia, other suitable type of information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) or mobile IP may be used to communicate the packets.

System 10 may utilize digital cellular protocols and technologies to provide the communication sessions. Example digital cellular protocols and technologies include the Institute of Electrical and Electronics Engineers, Inc. (IEEE) 802.xx standards such as 802.11 standards, the Global System for Mobile communications (GSM) standards, Universal Mobile Telecommunication System (UMTS) standards, Code Division Multiple Access (CDMA) 2000 standards, the Internet Engineering Task Force (IETF) standards, or other standards.

According to the illustrated embodiment, system 10 includes one or more base stations 24, an Internet Protocol (IP) network 28, one or more operator networks 32, one or more networks 36, and a server 38 coupled as shown. A base station 24 provides a mobile node 20 with wireless access to system 10. Base station 24 includes a base transceiver station and a base station controller. The base transceiver station communicates signals to and from mobile node 20. The base station controller manages the operation of the base transceiver station. The wireless link between mobile node 20 and base station 24 is typically a radio frequency link that may be cellular in network organization.

IP network 28 comprises a communication network that allows mobile node 20 to communicate with operator network 32. A communication network may refer to a network that allows devices to communicate with each other. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding. IP network 28 operates according to the Internet Protocol. In general, the Internet Protocol tracks the Internet addresses of nodes, routes outgoing messages, and recognizes incoming messages.

An operator network 32 may represent a communication network that is operated by a specific operator. An operator may refer to a mobile operator. Different operator networks 32*a-b* may operate according to different technologies, such as wireless, cable, optical, other wireline or wireless technology, or any combination of the preceding. For example, operator network 32*a* may be a wireless telephony operator, and operator network 32*b* may be a cable network operator. "Different" operator networks may refer to operator networks that are operated by different operators, and may have no or only some overlapping components. A technology may refer to processes and devices that operate according to a specific set of protocols. Different technologies may refer to processes and devices that operate according to different protocols. Information of one protocol may be translated to that of another protocol.

An operator network 32 may include gateways 40 that allow mobile node 20 to communicate with server 38. According to the illustrated embodiment, operator network 32*a* includes gateways 40*a-b*, and operator network 32*b* includes gateways 40*c-d*. A gateway 40 may represent any suitable logic comprising software, hardware, other logic, or any suitable combination of the preceding operable to interconnect network 28 with home network 36. Gateway 40 may be used to convert communications between different communication protocols. For example, gateway 40 may convert communications from the protocol of network 28 to any of various other protocols that may be used by home network 36. According to one embodiment, gateway 40 may comprise an access server network (ASN) gateway.

A gateway 40 may operate as an anchor point. An anchor point may refer to a point of a network that manages roaming connections for a communication session. The anchor point manages context information for a communication session. Context information may refer to information that may be used to support a communication session for mobile node 20. For example, the context information may be used to support mobility and service delivery as mobile node 20 moves. The context information may be associated with a mobile node, a communication session, a user, or any other suitable identifier.

Context information may include any suitable information that may be used to support a communication session for mobile node 20. For example, context information may include security information, technology identification, mobility information, billing information, service information, a user profile, cache information, other suitable information for supporting a communication session, or any combination of the preceding.

Security information may refer to information used to establish the access allowed to mobile node 20. As an example, security information may include the security credentials of mobile node 20. Security information may be transferred by directly transferring the security credentials from an old anchor point to a new anchor point. Security information may also be transferred by deriving keys at the new anchor point based on credentials sent from the old anchor point. As another example, security information may include authorization tokens granted by application servers.

Technology identification may refer to an identification of the technology used by mobile node 20. The technology identification may allow operator networks 32 of disparate technologies to determine the type of technology to provide to mobile node 20.

Mobility information may refer to information used to transfer a communication session to a new operator network 32. Mobility information may include, for example, context information. As an example, a mobile node may receive service from a mobile wireless network. The mobile node may move, and then have the option of receiving service from a cable network or a wireless local area network. The mobile node may select the cable network, and have the session context information transferred from mobile wireless network to the cable network.

Billing information may refer to information used to assess a cost for the communication session. For example, a server such as an authentication, authorization, and accounting (AAA) server may generate billing records for the session of the mobile node of the preceding example. The billing records may be generated by the AAA servers of the mobile wireless network and the cable network. The billing records may be generated by any suitable accounting system, such as a Remote Authentication Dial-In User Service (RADIUS) system or a Diameter system, and may be correlated or exchanged by AAA hierarchical model entities, such as an AAA broker. As the mobile node moves from the mobile wireless network to the cable network, the billing information is transferred from the mobile wireless network to the cable network.

Service profiles may refer to information used to provide services during the communication session. For example, service profiles may include a quality of service for each service. The mobile node of the preceding example may open multiple sessions: a first session for downloading a data file, a second session for making a voice call over an IP network, and a third session for video streaming. Each of these sessions may have different requirements for quality of service. As the mobile node moves from the mobile wireless network to the cable network, the service profiles are also transferred to allow the sessions to have equivalent or better quality of service.

Gateway 40*a* operating as an anchor point creates a tunnel 42 to connect mobile node 20 to network services. Tunnel 42 may be created according to any suitable tunneling technique. For example, a GPRS tunneling protocol (GTP) may be used for GSM networks, or mobile IP techniques may be used for CDMA networks.

A home network 36*a* comprises a communication network that includes a home agent 44*a*, and a foreign network 36*b* comprises a communication network that includes a foreign agent 44*b*. A home agent of a mobile node may refer to an agent that maintains the address of the mobile node and forwards data to the mobile node. According to one embodiment, home agent 44*a* may also instruct an old anchor point to transfer context information to a new anchor point. A foreign agent of a mobile node may refer to an agent that provides the home agent of the mobile node with an address to which data for the mobile node may be forwarded.

If mobile node 20 is in an area serviced by home agent 44a, home agent 44a forwards traffic to the location address of mobile node 20. If mobile node 20 moves to an area serviced by a foreign agent 44b, foreign agent 44b notifies home agent 44a that mobile node 20 has moved, and sends a forwarding address for mobile node 20 to home agent 44a. Home agent 44a forwards traffic to the forwarding address. According to one embodiment, home agent 44a may also instruct an old anchor point to transfer context information to a new anchor point. Any suitable device, however, may provide the instruction to transfer the context information.

Server 38 provides functionality requested by mobile node 20. Functionality may refer to providing a telephony service, providing information, other functionality, or any combination of the preceding. Telephony service may refer to any suitable service provided during a communication session.

A component of system 10 may include an interface, logic, memory, or any suitable combination of the preceding. As used in this document, "interface" refers to any suitable structure of a device operable to receive input for the device, send output from the device, or both, and may comprise one or more ports. Logic manages the operation of module, and may comprise any suitable hardware, software, or combination of hardware and software. For example, logic may include a processor. As used in this document, "processor" refers to any suitable device operable to execute instructions and manipulate data to perform operations.

As used in this document, "memory" refers to any structure operable to store and facilitate retrieval of information used by a processor, and may comprise Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of gateway 40 and agent 44a may be performed by one module, or the operations of agent 44a may be performed by more than one module. Additionally, operations of system 10 may be performed using any suitable logic comprising software, hardware, other logic, or any suitable combination of the preceding. As used in this document, "each" refers to each member of a set or each member of a subset of a set.

In operation, a communication session is established using a communication path between mobile node 20 and server 38 through base station 24a, IP network 28, gateway 40a, and home agent 44. A communication path may refer to a path between nodes through which information may be communicated. Gateway 40a operates as an anchor point for a communication session.

Figure 2:
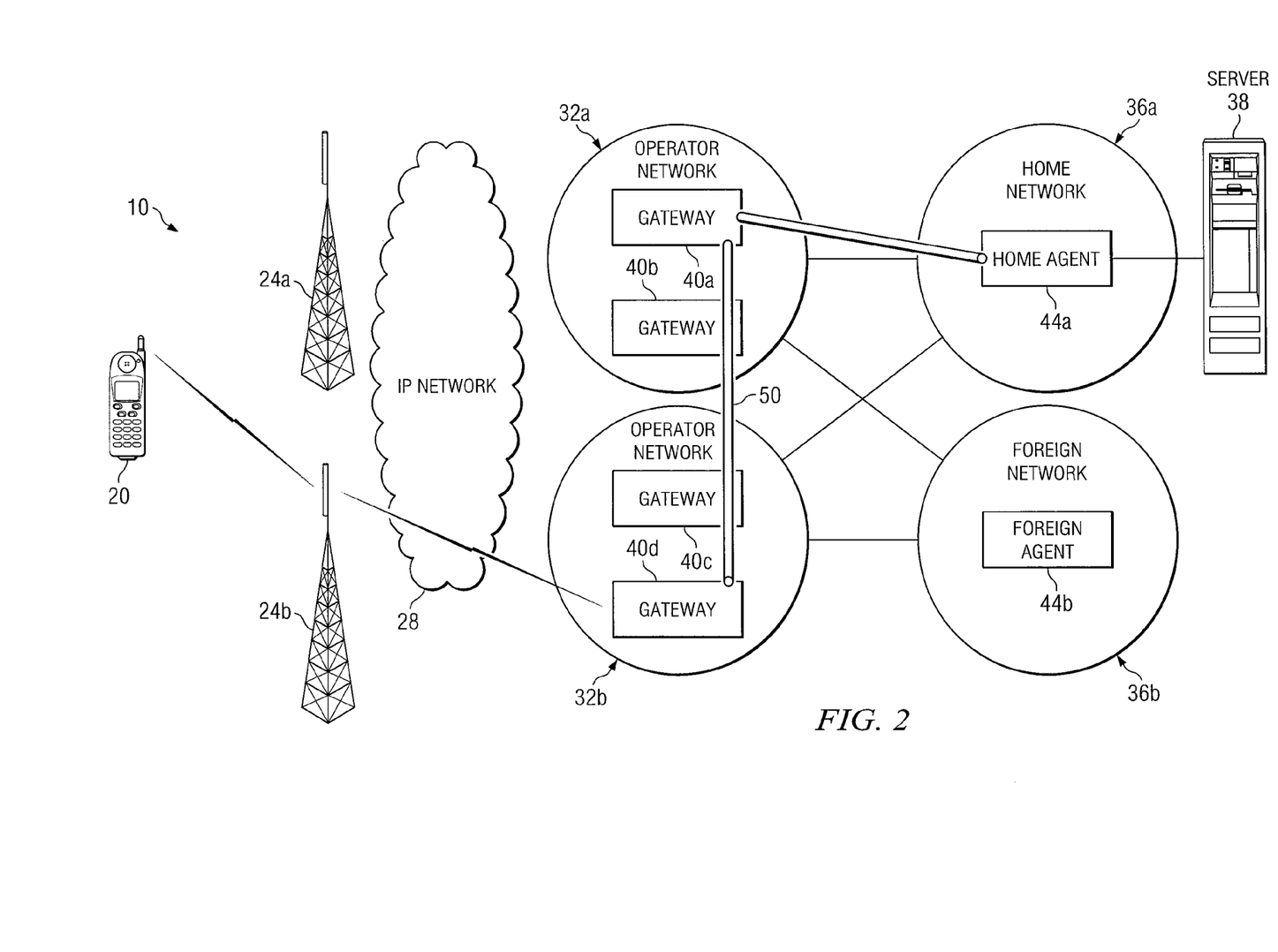
FIG. 2 is a diagram illustrating movement of a mobile node from one operator network to another operator network.

FIG. 2 is a diagram illustrating the movement of mobile node 20 from operator network 32a to operator network 32b. Mobile node 20 may make a micromove or a macromove. A micromove refers to a move from a gateway 40a of operator network 32a to another gateway 40b of the same operator network 32a. A macromove refers to a move from a gateway 40a of operator network 32a to another gateway 40c-d of another operator network 32b.

According to the illustrated embodiment, the communication path between mobile node 20 and server 38a passes through base station 24b, IP network 28, gateway 40d, gateway 40a, and home agent 44. Gateway 40d becomes the new anchor point for the communication session. As mobile node 20 moves from home network 36a to foreign network 36b, foreign agent 44b notifies home agent 44a of the move.

In response to the notification, home agent 44a initiates a context transfer from the old anchor point at operator network 32a to the new anchor point at operator 32b. An old anchor point may refer to an anchor point for a communication session prior to a move by mobile node 20, and a new anchor point may refer to an anchor point for the communication session after the move by mobile node 20. Traffic may be temporarily tunneled between gateway 40a and gateway 40b through tunnel 50.

Figure 3:
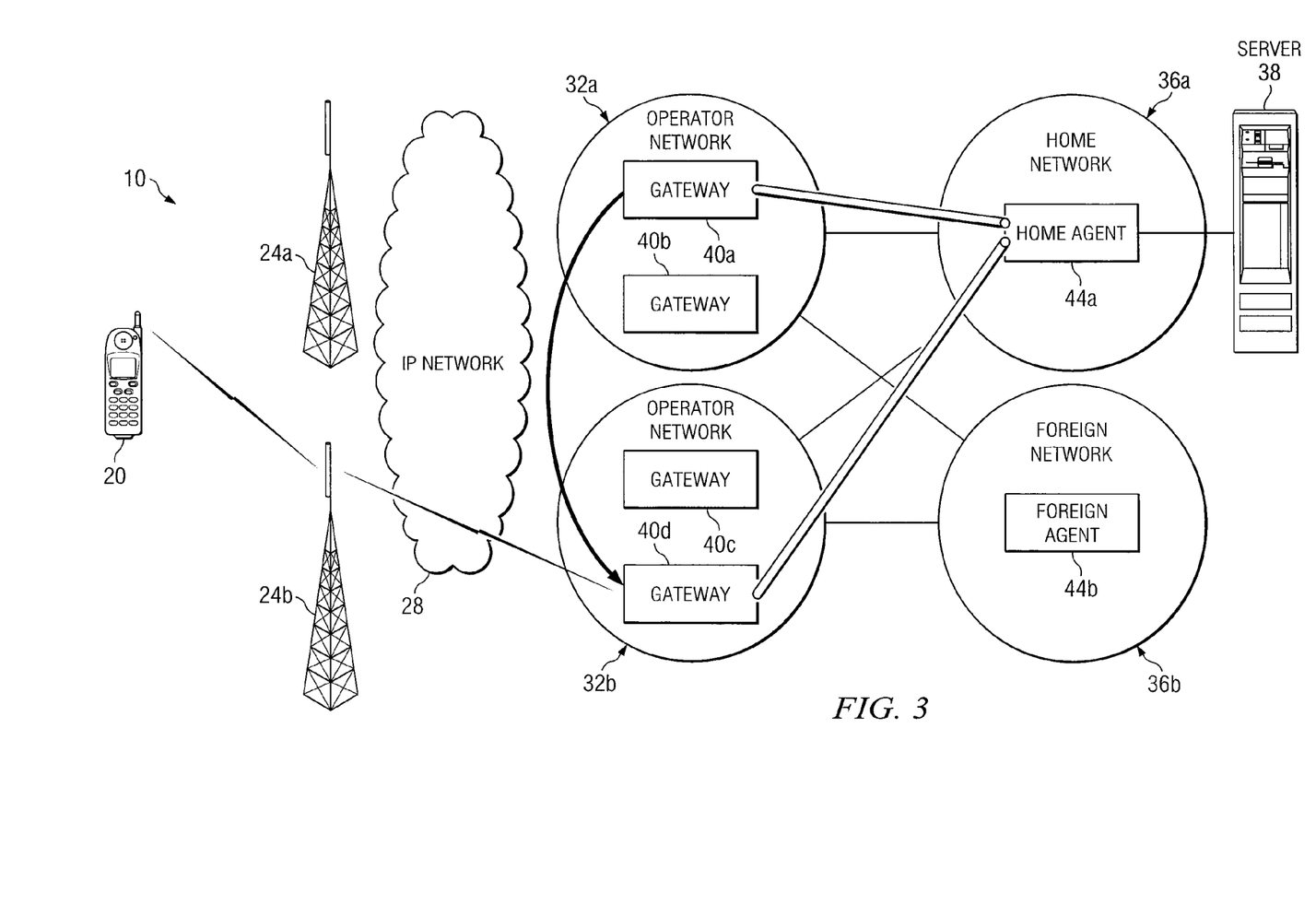
FIG. 3 is a diagram illustrating transfer of context information from an old anchor point to a new anchor point.

FIG. 3 is a diagram illustrating the transfer of context information from the anchor point of one network to the anchor point of the other network. Home network 44a instructs the old anchor point to transfer context information to the new anchor point. The old anchor point sends the information in response to the instruction. The transfer of context information may allow for each of the new anchor points to support communication sessions in a manner similar to that of the previous anchor point.

As the mobile node moves from a current network to a next network, the transferred context information may be mapped or transformed as appropriate for the next network. For example, a mobile node may move from a wireless network to a cable network. The context information may be changed from black and white to color because the cable network may have a higher capacity than that of the wireless network.

Figure 4:
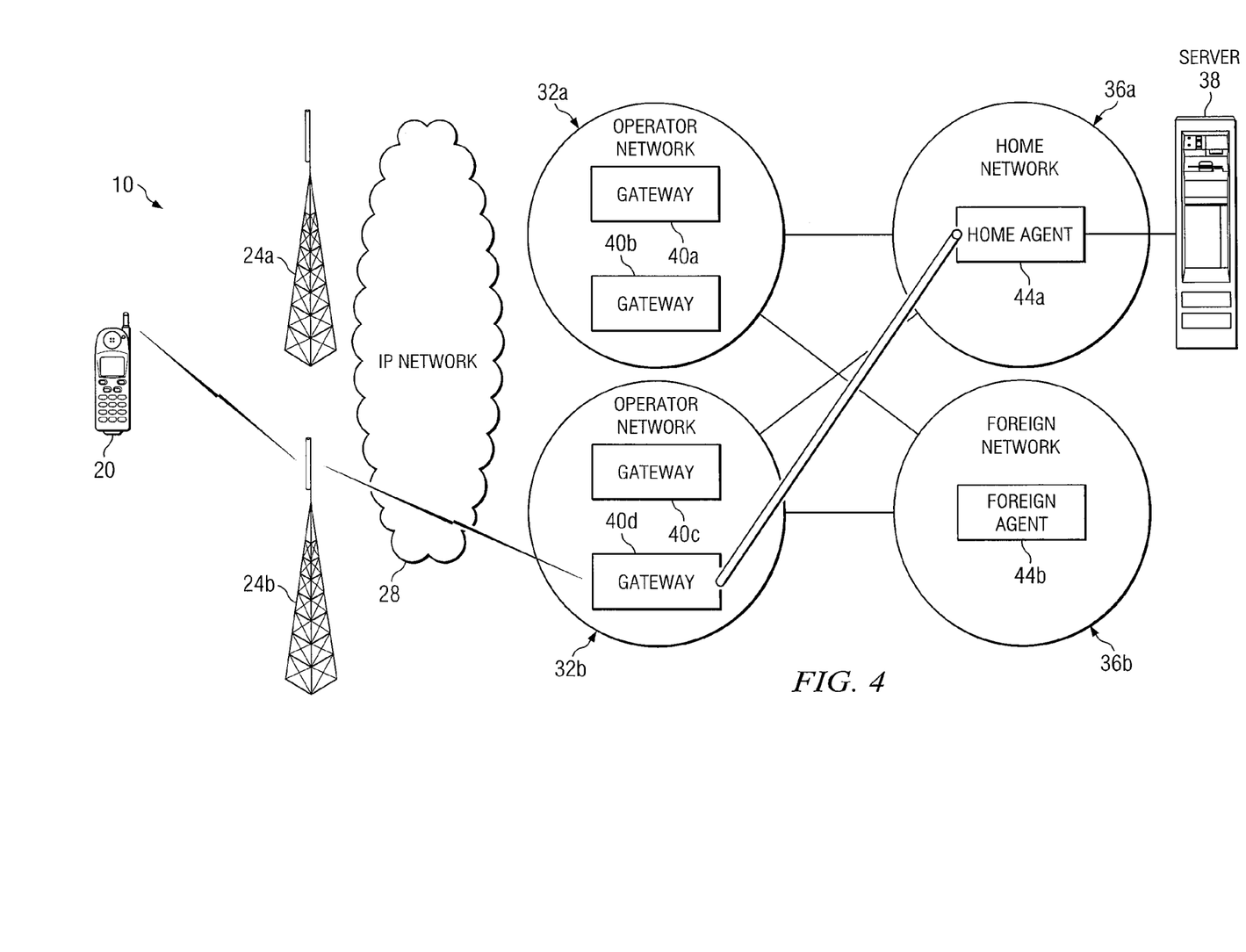
FIG. 4 is a diagram illustrating a moved mobile node communicating through the new anchor point.

FIG. 4 is a diagram illustrating moved mobile node 20 communicating with server 38 through the new anchor point at gateway 40d. According to the illustrated embodiment, the communication path between mobile node 20 and server 38a passes through base station 24b, IP network 28, gateway 40d, and home agent 44. That is, the communication path bypasses the old anchor point at gateway 40a.

According to the embodiment, establishing a new anchor point at gateway 40d may offer improvements, such as more flexible network scalability, reduced network latency, and increased capacity. Old anchor point at gateway 40a is no longer needed to communicate with server 38. Accordingly, tunnel 50 between the old anchor point at gateway 40a and the new anchor point at gateway 40d is no longer needed.

Modifications, additions, or omissions may be made to the method without departing from the scope of the invention. The method may include more, fewer, or other steps. Additionally, steps may be performed in any suitable order without departing from the scope of the invention.

Figure 5:
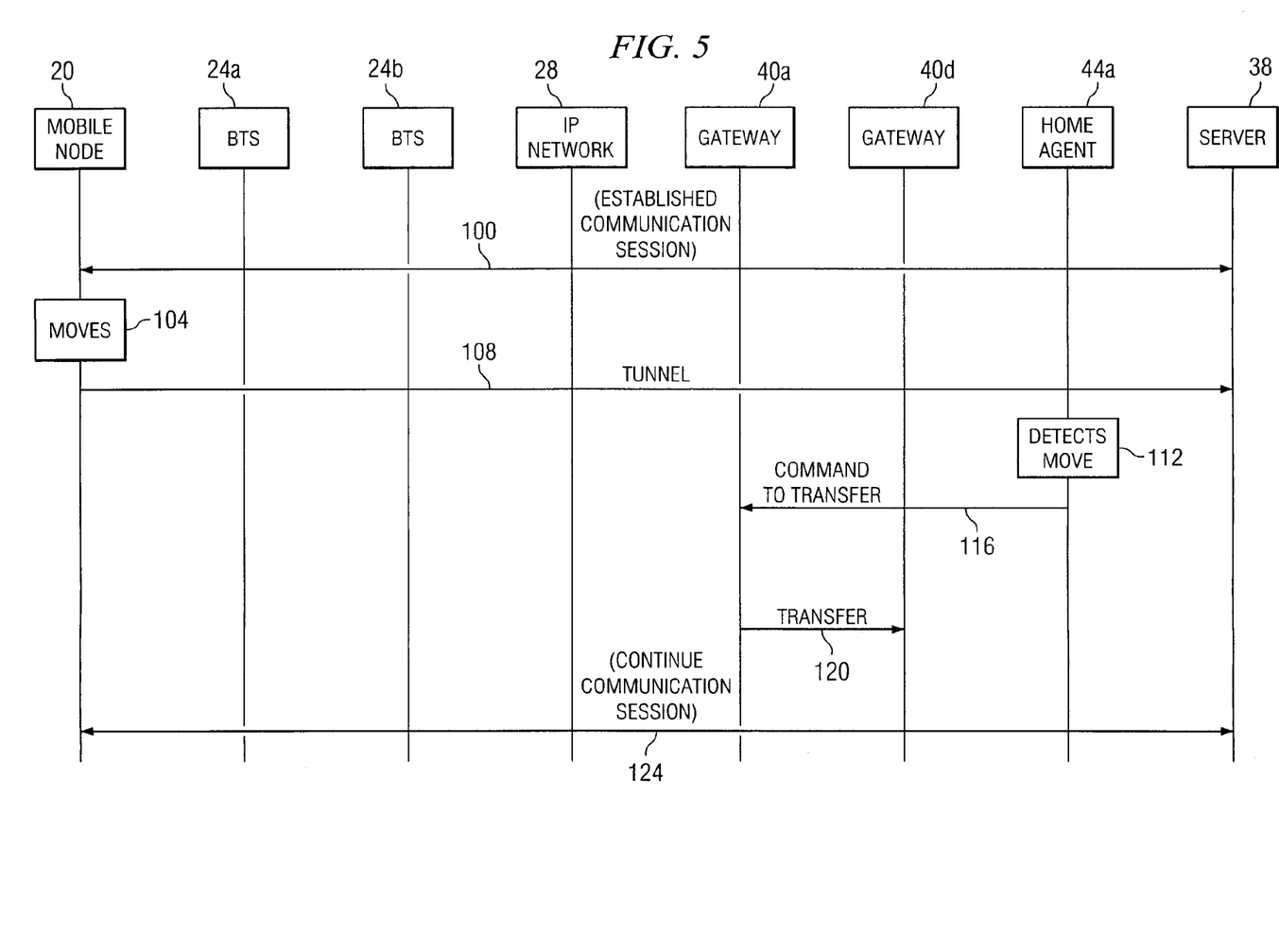
FIG. 5 is a call flow diagram illustrating one embodiment of a method for transferring context information from an old anchor point to a new anchor point.

FIG. 5 is a call flow diagram illustrating one embodiment of a method for transferring context information from an old anchor point to a new anchor point. An old anchor point may refer to an anchor point for a communication session prior to a move by mobile node 20, and a new anchor point may refer to an anchor point for the communication session after the move by mobile node 20.

The method begins at step 100, where mobile node 20 communicates with server 38 during a communication session. The communication session uses a communication path between mobile node 20 and server 38a through base station 24a, IP network 28, gateway 40a, and home agent 44. Gateway 40a operates as the anchor point for the session.

Mobile node 20 moves at step 104. Mobile node 20 may make a macromove or a micromove. According to the illustrated embodiment, mobile node 20 makes a macromove by moving from operator network 32a to operator network 32b. A tunnel 50 is temporarily established between the new anchor point at gateway 40d and the old anchor point at gateway 40a at step 108. The tunnel may be used to communicate initial security information.

Home agent 44a detects that mobile node 20 has moved at step 112. Home agent 44a may detect the movement in response to a notification by foreign agent 44b. Home agent 44a sends a command to the old anchor point at gateway 40a to transfer context information at step 116. The context information may refer to information that may be used to support the communication session.

The old anchor point at gateway 40a transfers the context information to the new anchor point at gateway 40d at step 120. The transfer of the context information allows gateway 40d to operate as a new anchor point. The communication session is confirmed at step 124. According to the illustrated embodiment, the communication path between mobile node 20 and server 38a passes through base station 24b, IP network 28, gateway 40d, and home agent 44. That is, gateway 40d operates as the new anchor point, and the communication path bypasses the old anchor point at gateway 40a.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a new anchor point is established when a mobile node moves to a new communication network. The new anchor point allows for communicating along a communication path that bypasses the old anchor point. Bypassing the old anchor point may improve network capacity and reduce network latency.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for facilitating mobile node mobility, comprising:
    facilitating at a first anchor point a communication session for a mobile node, the communication session communicated along a first communication path, the first communication path including a home agent associated with a home network, the home agent configured to forward traffic to the mobile node;
    managing context information for the communication session, the context information comprising information for supporting the communication session;
    receiving, from the home agent, a command to transfer the context information to a second anchor point, the second anchor point operable to facilitate communication of the communication session along a second communication path routed to the home agent through the first anchor point; and
    transferring the context information in response to the command, the second communication path bypassing the first anchor point after the context information is transferred to the second anchor point, the second communication path continuing routing to the home agent after bypassing the first anchor point.

2. The method of claim 1, wherein:
the first anchor point is associated with a first operator network;
the second anchor point is associated with a second operator network, the second operator network different from the first operator network; and
the home agent is associated with a home network, the home network separate from the first and second operator networks.

3. The method of claim 1, wherein:
the first anchor point is associated with a first technology;
the second anchor point is associated with a second technology, the second technology different from the first technology; and
transferring the context information in response to the command further comprises:
    notifying the second anchor point of the first technology.

4. An apparatus for facilitating mobile node mobility, comprising:
    a first anchor point operable to:
        facilitate a communication session for a mobile node, the communication session communicated along a first communication path, the first communication path including a home agent associated with a home network, the home agent configured to forward traffic to the mobile node; and
        manage context information for the communication session, the context information comprising information for supporting the communication session; and
    an interface operable to:
        receive, from the home agent, a command to transfer the context information to a second anchor point, the second anchor point operable to facilitate communication of the communication session along a second communication path routed to the home agent through the first anchor point; and
    the first anchor point further operable to:
        transfer the context information in response to the command, the second communication path bypassing the first anchor point after the context information is transferred to the second anchor point, the second communication path continuing routing to the home agent after bypassing the first anchor point.

5. The apparatus of claim 4, wherein:
the first anchor point is associated with a first operator network;
the second anchor point is associated with a second operator network, the second operator network different from the first operator network; and
the home agent is associated with a home network, the home network separate from the first and second operator networks.

6. The apparatus of claim 5, wherein:
the first anchor point is associated with a first technology;
the second anchor point is associated with a second technology, the second technology different from the first technology; and
the first anchor point is further operable to transfer the context information in response to the command by:
    notifying the second anchor point of the first technology.

7. The apparatus of claim 4, wherein:
the second communication path initially includes the first anchor point; and
after the context information is transferred to the second anchor point, the second communication path bypasses the first anchor point.

8. The apparatus of claim 4, wherein:
the first anchor point is associated with a first operator network;

the second anchor point is associated with a second operator network, the second operator network different from the first operator network;
the first anchor point is associated with a first technology;
the second anchor point is associated with a second technology, the second technology different from the first technology;
the first anchor point is further operable to transfer the context information in response to the command by:
notifying the second anchor point of the first technology; and
the second communication path bypasses the first anchor point.

9. A system for facilitating mobile node mobility, comprising:
means for facilitating at a first anchor point a communication session for a mobile node, the communication session communicated along a first communication path, the first communication path including a home agent associated with a home network, the home agent configured to forward traffic to the mobile node;
means for managing context information for the communication session, the context information comprising information for supporting the communication session;
means for receiving, from the home agent, a command to transfer the context information to a second anchor point, the second anchor point operable to facilitate communication of the communication session along a second communication path routed to the home agent through the first anchor point; and
means for transferring the context information in response to the command, the second communication path bypassing the first anchor point after the context information is transferred to the second anchor point, the second communication path continuing routing to the home agent after bypassing the first anchor point.

10. A method for facilitating mobile node mobility, comprising:
facilitating a communication session for a mobile node, the communication session communicated along a first communication path, the first communication path including a home agent associated with a home network, context information for the communication session managed by a first anchor point, the context information comprising information for supporting the communication session;
receiving a notification from a foreign agent, the notification indicating that the mobile node has moved; and
instructing, by the home agent, the first anchor point to transfer the context information to a second anchor point, the second anchor point operable to communicate the communication session along a second communication path routed to the home agent through the first anchor point, the second communication path bypassing the first anchor point after the context information is transferred to the second anchor point.

11. The method of claim 10, wherein:
the first anchor point is associated with a first operator network; and
the second anchor point is associated with a second operator network, the second operator network different from the first operator network.

12. The method of claim 10, wherein:
the first anchor point is associated with a first technology; and
the second anchor point is associated with a second technology, the second technology different from the first technology.

13. The method of claim 10, wherein:
the second communication path initially includes the first anchor point; and
after the context information is transferred to the second anchor point, the second communication path bypasses the first anchor point.

14. An apparatus for facilitating mobile node mobility, comprising:
logic located at a home agent and operable to:
facilitate a communication session for a mobile node, the communication session communicated along a first communication path, the first communication path including a home agent associated with a home network, the home agent configured to forward traffic to the mobile node, context information for the communication session managed by a first anchor point, the context information comprising information for supporting the communication session;
an interface coupled to the logic and operable to:
receive a notification from a foreign agent, the notification indicating that the mobile node has moved;
the logic further operable to:
instruct, by the home agent, the first anchor point to transfer the context information to a second anchor point, the second anchor point operable to communicate the communication session along a second communication path routed to the home agent through the first anchor point, the second communication path bypassing the first anchor point after the context information is transferred to the second anchor point, the second communication path continuing routing to the home agent after bypassing the first anchor point.

15. The apparatus of claim 14, wherein:
the first anchor point is associated with a first operator network; and
the second anchor point is associated with a second operator network, the second operator network different from the first operator network.

16. The apparatus of claim 14, wherein:
the first anchor point is associated with a first technology; and
the second anchor point is associated with a second technology, the second technology different from the first technology.

17. The apparatus of claim 14, wherein:
the second communication path initially includes the first anchor point; and
after the context information is transferred to the second anchor point, the second communication path bypasses the first anchor point.

18. The apparatus of claim 14, wherein:
the first anchor point is associated with a first operator network;
the second anchor point is associated with a second operator network, the second operator network different from the first operator network;
the first anchor point is associated with a first technology;
the second anchor point is associated with a second technology, the second technology different from the first technology; and
the second communication path bypasses the first anchor point.

19. A system for facilitating mobile node mobility, comprising:

means for facilitating a communication session for a mobile node, the communication session communicated along a first communication path, the first communication path including a home agent associated with a home network, the home agent configured to forward traffic to the mobile node, context information for the communication session managed by a first anchor point, the context information comprising information for supporting the communication session;

means for receiving a notification from a foreign agent, the notification indicating that the mobile node has moved; and means for instructing, by the home agent, the first anchor point to transfer the context information to a second anchor point, the second anchor point operable to communicate the communication session along a second communication path routed to the home agent through the first anchor point, the second communication path bypassing the first anchor point after the context information is transferred to the second anchor point, the second communication path continuing routing to the home agent after bypassing the first anchor point.

20. A system for facilitating mobile node mobility, comprising:

a first anchor point operable to:
  manage context information for a communication session for a mobile node, the context information comprising information for supporting the communication session, the communication session communicated along a first communication path, the first communication path including a home agent associated with a home network, the home agent configured to forward traffic to the mobile node; and an agent coupled to the first anchor point, the agent comprising the home agent and operable to:
  instruct the first anchor point to transfer context information to a second anchor point, the second anchor point operable to communicate the communication session along a second communication path routed to the home agent through the first anchor point; and the first anchor point further operable to:
  transfer the context information in response to the instruction, the second communication path bypassing the first anchor point after the context information is transferred to the second anchor point, the second communication path continuing routing to the home agent after bypassing the first anchor point.

21. The system of claim 20, wherein:
the first anchor point is associated with a first operator network; and
the second anchor point is associated with a second operator network, the second operator network different from the first operator network.

22. The system of claim 20, wherein:
the first anchor point is associated with a first technology;
the second anchor point is associated with a second technology, the second technology different from the first technology; and
the first anchor point is further operable to:
  transfer the context information in response to the instruction by:
    notifying the second anchor point of the first technology.

23. The system of claim 20, wherein:
the second communication path initially includes the first anchor point; and
after the context information is transferred to the second anchor point, the second communication path bypasses the first anchor point.

24. The system of claim 20, wherein:
the first anchor point is associated with a first operator network;
the second anchor point is associated with a second operator network, the second operator network different from the first operator network;
the first anchor point is associated with a first technology;
the second anchor point is associated with a second technology, the second technology different from the first technology;
the first anchor point is further operable to:
  transfer the context information in response to the instruction by:
    notifying the second anchor point of the first technology; and
the second communication path bypasses the first anchor point.

* * * * *